Aug. 7, 1928.

T. M. MOORE 1,679,620

YIELDING FASTENER

Filed Oct. 4, 1926

Witnesses:

Inventor:
Thomas M. Moore,
By Joshua R H Potts
His Attorney

Patented Aug. 7, 1928.

1,679,620

UNITED STATES PATENT OFFICE.

THOMAS M. MOORE, OF CHICAGO, ILLINOIS.

YIELDING FASTENER.

Application filed October 4, 1926. Serial No. 139,321.

My invention relates to a yielding fastener, designed especially for use in securing frangible material, such as glass, porcelain or the like, to a support, the main object of my invention being to provide an improved construction of means by which to secure such material in supported position without breaking or fracturing the same. Another object of my invention is to provide a yielding fastener of simple construction involving few parts, inexpensive to manufacture; and a still further object is to provide a device that is not liable easily to get out of order while supporting or securing a heavy panel in place.

Other objects will appear hereinafter.

The invention consists in the combinations and arrangements of parts hereinafter described and claimed.

Figure 1:
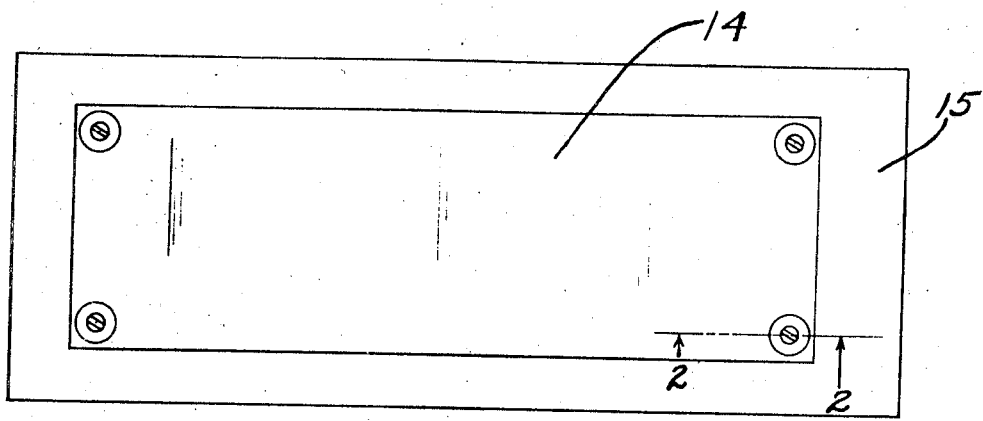
Figure 2:
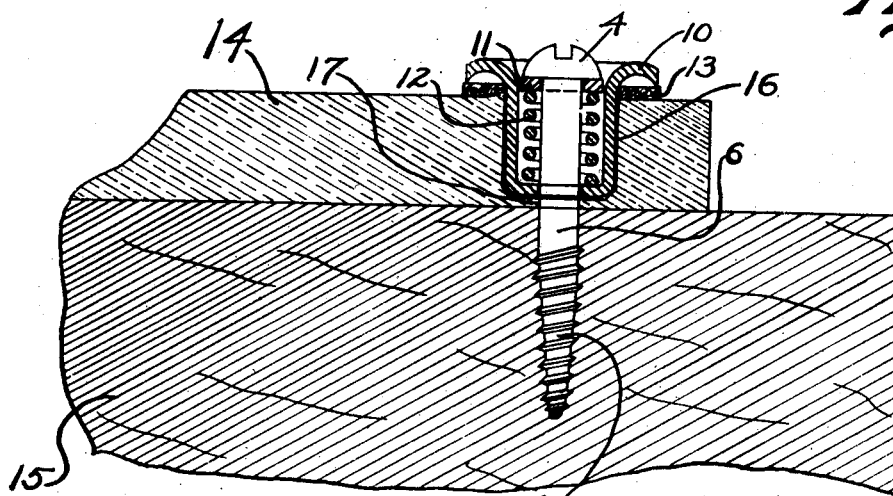
Figure 3:
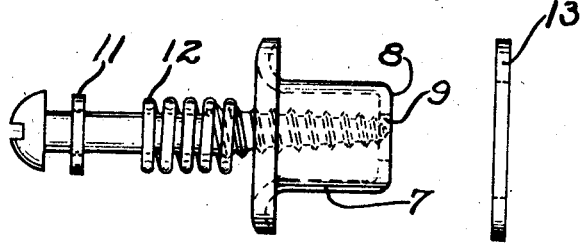

The invention will be best understood by reference to the accompanying drawing forming a part of this specification, and in which, Fig. 1 is a top plan view showing a glass pane or panel secured to a support by means of my yielding fasteners;

Fig. 2 is a detailed sectional view, on an enlarged scale, taken on the line 2—2 of Fig. 1; and Fig. 3 represents a plan view on an enlarged scale of a fastener device made in accordance with my present invention, the parts being shown from the lefthand end of the figure to the right-hand end thereof in the order of their assembly, and the pliable washer being shown separated from the cup-shaped shell.

My invention, in its preferred form of construction, as illustrated in the accompanying drawing, comprises a fastener member in the form of a screw having a head 4, a screw threaded end 5 and a plain portion 6 occupying a position between the screw threaded end 5 and the head end 4. Associated with the screw fastener is a cup-shaped shell 7, the bottom part 8 of which is provided with a central aperture 9 through which the threaded end of the screw is passed, as shown in Fig. 2. At its top end, the cup-shaped shell 7 is formed with an annular outturned flange 10. Loosely mounted upon the screw fastener is a ring 11 and a coiled spring 12, the ring 11 abutting the head end 4 while the spring 12 is imprisoned between the inner face of the bottom 8 and the ring 11. A washer 13 of suitable pliable material is placed around the cylindrical body of the cup-shaped shell 7 to abut against the annular outturned flange 10.

In the accompanying drawing, I have shown by way of example, a practical application of my improved yielding fasteners; the numeral 14 designating a glass plate or panel which is secured by my improved fasteners upon a supporting frame 15. At each point where a fastener device is to be applied, the plate 14 is provided with a countersink 16 for the accomodation of the cup-shaped shell. Leading through the glass plate 14 in central alinement with each countersink 16 is an aperture 17 through which the screw fastener is passed for its threaded engagement with the supporting frame 15. The pliable ring 13 surrounding the cylindrical body of the cup-shaped shell, occupies a position between the outer face of the glass panel and the outturned flange 12; and according to an important feature of my invention, the ring 11 and the head end 4 are both of a size to fit inside the shell when the coiled spring is compressed by threading or advancing the screw fastener into the supporting frame 15.

From the foregoing description and a study of the accompanying drawing it will be apparent that my improved fastener devices are well adapted to hold the glass panel firmly in position without breaking the same, since the glass panel is mounted upon the cup-shaped shells 7, which in turn are mounted for yielding movement upon the fastener screws threaded into the support.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A device for fastening glass or the like to a support comprising a headed screw; a cap-shaped shell having a bottom hole and having an outturned rim flange; a ring loosely fitting upon the screw and abutting the head thereof; a spring surrounding the screw and imprisoned between the bottom of said shell and said ring; and a washer surrounding the shell and abutting said rim flange, substantially as described.

2. A device for fastening glass or the like to a support comprising a headed screw; a cup-shaped shell apertured in its bottom and provided with an outturned rim flange; a spring imprisoned between the bottom of said shell and the head of said screw; and a washer surrounding the said shell and abutting said rim flange thereof, substantially as described.

3. Means for securing an element to a support embodying, in combination, a cup-shaped shell having a rim flange, said shell being adapted to extend into the body of said element; a fastener member extending through the bottom of said shell and said element and into said support; a head on the fastener member of slightly smaller diameter than said shell and adapted to be contained therein; a spring arranged in the shell and imprisoned between the bottom thereof and said head whereby when said fastener member is advanced into said support, said element will be yieldingly tightened thereto, substantially as described.

4. Means for securing an element to a support embodying, in combination, a cup-shaped shell adapted to extend into the body of said element and provided with a rim flange; a fastener member extending through the bottom of the shell of said element and into said support; a head on the fastener member; a ring loosely fitting said screw and abutting said head; a spring arranged in the shell and imprisoned between the bottom thereof and said ring, said head and ring being of a size to fit within the interior of said shell, substantially as described.

5. Means for securing an element to a support embodying, in combination, a cup-shaped shell adapted to extend into the body of said element and provided with an outturned rim flange; a fastener member extending through the bottom of said shell and said element and into said support; a head on the fastener member; a spring arranged in the shell and imprisoned between the bottom thereof and said head; said head being of a size to fit within the interior of said shell; and a washer surrounding said shell and interposed between said element and said rim flange, substantially as described.

In testimony whereof I have signed my name to this specification.

THOMAS M. MOORE.